United States Patent
Long et al.

(10) Patent No.: US 12,127,551 B2
(45) Date of Patent: Oct. 29, 2024

(54) SYSTEM AND METHOD FOR SPRAY MONITORING

(71) Applicant: CNH Industrial America LLC, New Holland, PA (US)

(72) Inventors: Scott Allen Long, Plainfield, IL (US); Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 197 days.

(21) Appl. No.: 16/809,263

(22) Filed: Mar. 4, 2020

(65) Prior Publication Data
US 2021/0274772 A1    Sep. 9, 2021

(51) Int. Cl.
| | | |
|---|---|---|
| *A01M 7/00* | (2006.01) | |
| *A01C 23/00* | (2006.01) | |
| *A01C 23/04* | (2006.01) | |
| *B05B 1/20* | (2006.01) | |
| *B05B 12/08* | (2006.01) | |
| *G01S 13/88* | (2006.01) | |
| *G01S 15/88* | (2006.01) | |
| *G01S 17/88* | (2006.01) | |

(52) U.S. Cl.
CPC ......... *A01M 7/0089* (2013.01); *A01C 23/007* (2013.01); *A01C 23/047* (2013.01); *A01M 7/0042* (2013.01); *B05B 1/20* (2013.01); *B05B 12/08* (2013.01); *G01S 13/88* (2013.01); *G01S 15/88* (2013.01); *G01S 17/88* (2013.01)

(58) Field of Classification Search
CPC .............. A01M 7/0089; A01M 7/0042; A01C 23/007; A01C 23/047; B05B 1/20; B05B 12/08
See application file for complete search history.

(56) References Cited

U.S. PATENT DOCUMENTS 3,875,266 A * 4/1975 Fonagy .................... F02M 7/22
                                                         261/50.2
4,220,998 A * 9/1980 Kays ........................ B05B 9/06
                                                         239/162

(Continued)

OTHER PUBLICATIONS

Patriot Series Sprayer, Case IH, (15 pages) http:/heartlandagequipment.com/wp-content/uploads/2016/10/Patriot_Brochure_spreads_08-16_CIH07271601.pdf.

*Primary Examiner* — Joseph A Greenlund
(74) *Attorney, Agent, or Firm* — Rebecca Henkel; Peter K. Zacharias; Rickard K. DeMille

(57) ABSTRACT

An agricultural applicator system is provided herein that includes a boom assembly and one or more nozzles positioned along the boom assembly. The one or more nozzles are configured to selectively dispense an agricultural product therefrom. A sensor is operably coupled with the boom assembly and is configured to capture data associated with one or more application variables. A controller is commutatively coupled to the sensor and includes a processor and associated memory. The memory stores instructions that, when implemented by the processor, configure the controller to receive the data associated with one or more application variables and provide a notification when the data associated with one or more application variables are outside of a range defined by a predefined lower and upper threshold. The controller may also pause an application operation of the agricultural product until the notification is acknowledged by an operator.

10 Claims, 7 Drawing Sheets

(56) References Cited

U.S. PATENT DOCUMENTS

| | | | | |
|---|---|---|---|---|
| 4,803,626 | A * | 2/1989 | Bachman | G05D 7/0611 |
| | | | | 701/50 |
| 4,905,897 | A * | 3/1990 | Rogers | A01M 7/0096 |
| | | | | 340/606 |
| 5,884,205 | A | 3/1999 | Elmore et al. | |
| 5,995,895 | A * | 11/1999 | Watt | G05D 1/0274 |
| | | | | 56/10.2 G |
| 5,995,902 | A * | 11/1999 | Monson | G05D 1/0278 |
| | | | | 345/442 |
| 6,062,496 | A * | 5/2000 | Kinter | A01M 7/0089 |
| | | | | 239/575 |
| 6,460,643 | B1 * | 10/2002 | Degelman | B62D 53/02 |
| | | | | 180/235 |
| 6,669,105 | B2 | 12/2003 | Bryan et al. | |
| 6,678,580 | B2 * | 1/2004 | Benneweis | A01B 79/005 |
| | | | | 700/240 |
| 6,749,035 | B2 | 1/2004 | Bundy | |
| 7,311,004 | B2 * | 12/2007 | Giles | A01M 7/0096 |
| | | | | 239/176 |
| 7,388,662 | B2 | 6/2008 | Cantin et al. | |
| 7,502,665 | B2 * | 3/2009 | Giles | B05B 15/50 |
| | | | | 239/69 |
| 7,740,189 | B2 | 6/2010 | Meyer et al. | |
| 8,065,054 | B2 * | 11/2011 | Tarasinski | B60G 17/016 |
| | | | | 340/407.1 |
| 8,154,711 | B1 * | 4/2012 | Scheer | B05B 12/082 |
| | | | | 356/3.07 |
| 8,463,460 | B2 * | 6/2013 | Sprock | E02F 9/2054 |
| | | | | 701/2 |
| 8,869,908 | B2 | 10/2014 | Zhu et al. | |
| 8,919,676 | B2 | 12/2014 | Funseth et al. | |
| 8,924,030 | B2 | 12/2014 | Wendte et al. | |
| 9,532,563 | B2 * | 1/2017 | Arenson | A01M 7/0089 |
| 9,759,568 | B2 | 9/2017 | Hillger et al. | |
| 10,149,468 | B2 * | 12/2018 | Crinklaw | G05D 1/0274 |
| 10,219,506 | B2 * | 3/2019 | Ni | A01M 7/005 |
| 10,279,366 | B2 * | 5/2019 | Larbi | B05B 12/008 |
| 10,441,965 | B2 * | 10/2019 | Feldhaus | B05B 1/20 |
| 2010/0250056 | A1 | 9/2010 | Perkins | |
| 2011/0153168 | A1 * | 6/2011 | Peterson | A01B 79/005 |
| | | | | 701/50 |
| 2013/0037625 | A1 * | 2/2013 | Arenson | A01M 7/0089 |
| | | | | 239/71 |
| 2016/0280221 | A1 * | 9/2016 | Jung | B60W 30/02 |
| 2016/0368011 | A1 * | 12/2016 | Feldhaus | B05B 12/124 |
| 2017/0274400 | A1 * | 9/2017 | Kowalchuk | B05B 12/008 |
| 2017/0295719 | A1 * | 10/2017 | Jugovich | A01M 7/0089 |
| 2017/0325443 | A1 * | 11/2017 | Crinklaw | A01M 7/0014 |
| 2018/0220638 | A1 * | 8/2018 | Gresch | A01M 7/0057 |
| 2018/0325012 | A1 * | 11/2018 | Ferrari | A01B 69/001 |
| 2019/0000003 | A1 * | 1/2019 | Brooks | B05B 12/12 |
| 2019/0116726 | A1 * | 4/2019 | Paralikar | G06T 7/001 |
| 2019/0126308 | A1 * | 5/2019 | Hendrickson | B05B 1/20 |
| 2019/0128864 | A1 * | 5/2019 | Pickett | A01M 7/0089 |
| 2019/0150357 | A1 * | 5/2019 | Wu | H04N 7/188 |
| 2019/0174738 | A1 * | 6/2019 | Hunt | A01M 7/0089 |
| 2020/0029484 | A1 * | 1/2020 | Weidenbach | A01B 63/24 |
| 2021/0127567 | A1 * | 5/2021 | Loukili | A01M 7/0042 |
| 2021/0274772 | A1 * | 9/2021 | Long | B05B 12/08 |
| 2021/0308708 | A1 * | 10/2021 | Stanhope | B05B 1/20 |

* cited by examiner

SYSTEM AND METHOD FOR SPRAY MONITORING

FIELD

The present disclosure generally relates to agricultural implements and, more particularly, to systems and methods for monitoring the operational status of an applicator of an agricultural implement, such as by monitoring the operating status of applicators based on various spray quality metrics.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients (such as an herbicide, fertilizer, fungicide, a pesticide, or another product).

The applicators may be pulled as an implement or self-propelled, and can include a tank, a pump, a boom assembly, and a plurality of nozzles carried by the boom assembly at spaced locations. The boom assembly typically includes a pair of boom arms, with each boom arm extending to either side of the applicator when in an unfolded state. Each boom arm may include multiple boom sections, each with a number of spray nozzles (also sometimes referred to as spray tips).

The spray nozzles on the boom assembly disperse the agricultural product carried by the applicator onto a field. During a spray operation, however, various factors may affect a quality of application of the agricultural product to the field. Accordingly, an improved system and method for monitoring the quality of application of the agricultural product to the field would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural applicator system that a boom assembly and one or more nozzles positioned along the boom assembly. The one or more nozzles are configured to selectively dispense an agricultural product therefrom. A sensor is operably coupled with the boom assembly and is configured to capture data associated with one or more application variables. A controller is commutatively coupled to the sensor. The controller includes a processor and associated memory. The memory stores instructions that, when implemented by the processor, configure the controller to receive, from the sensor, the data associated with one or more application variables: analyze the data associated with one or more application variables to determine whether any of the one or more variables are outside of a predefined range defined by a lower and upper threshold: provide a notification when the data associated with one or more application variables are outside of the predefined range; and pause an application operation of the agricultural product until the notification is acknowledged by an operator.

In some aspects, the present subject matter is directed to an agricultural work vehicle that includes a chassis supporting a cab and a boom assembly. One or more nozzles is positioned along the boom assembly and is configured to selectively dispense an agricultural product therefrom. A sensor is operably coupled with the boom assembly and is configured to capture data associated with one or more application variables. A controller is commutatively coupled to the sensor and includes a processor and associated memory. The memory stores instructions that, when implemented by the processor, configure the controller to receive, from the sensor, the data associated with one or more application variables: analyze the data associated with the one or more application variables to determine a spray quality index: provide a notification within the cab when the spray quality index deviates from a predefined range: provide a mitigation instruction based on the spray quality index exceeding the predefined range.

In some aspects, the present subject matter is directed to a method for monitoring a plurality of application variables as an application operation is being performed within a field using a work vehicle. The method includes receiving a predefined lower and upper threshold for each of the plurality of application variables. The method also includes receiving application data associated with a given portion of the field, the application data corresponding to each of the plurality of application variables for a given portion of the field as an agricultural product is applied to the field. In addition, the method includes analyzing each of the plurality of application variables to determine whether each of the one or more application variables is between the predefined lower and upper threshold for each of a plurality of application variables. The method further includes providing a first lower priority notification when any of the plurality of application variables deviates from a range defined by the predefined lower and upper threshold by a first amount and a second higher priority notification when any of the plurality of application variables deviates from the predefined lower and upper threshold by a second, larger amount. Lastly, the method includes pausing the application operation until the second higher priority notification is acknowledged by an operator.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
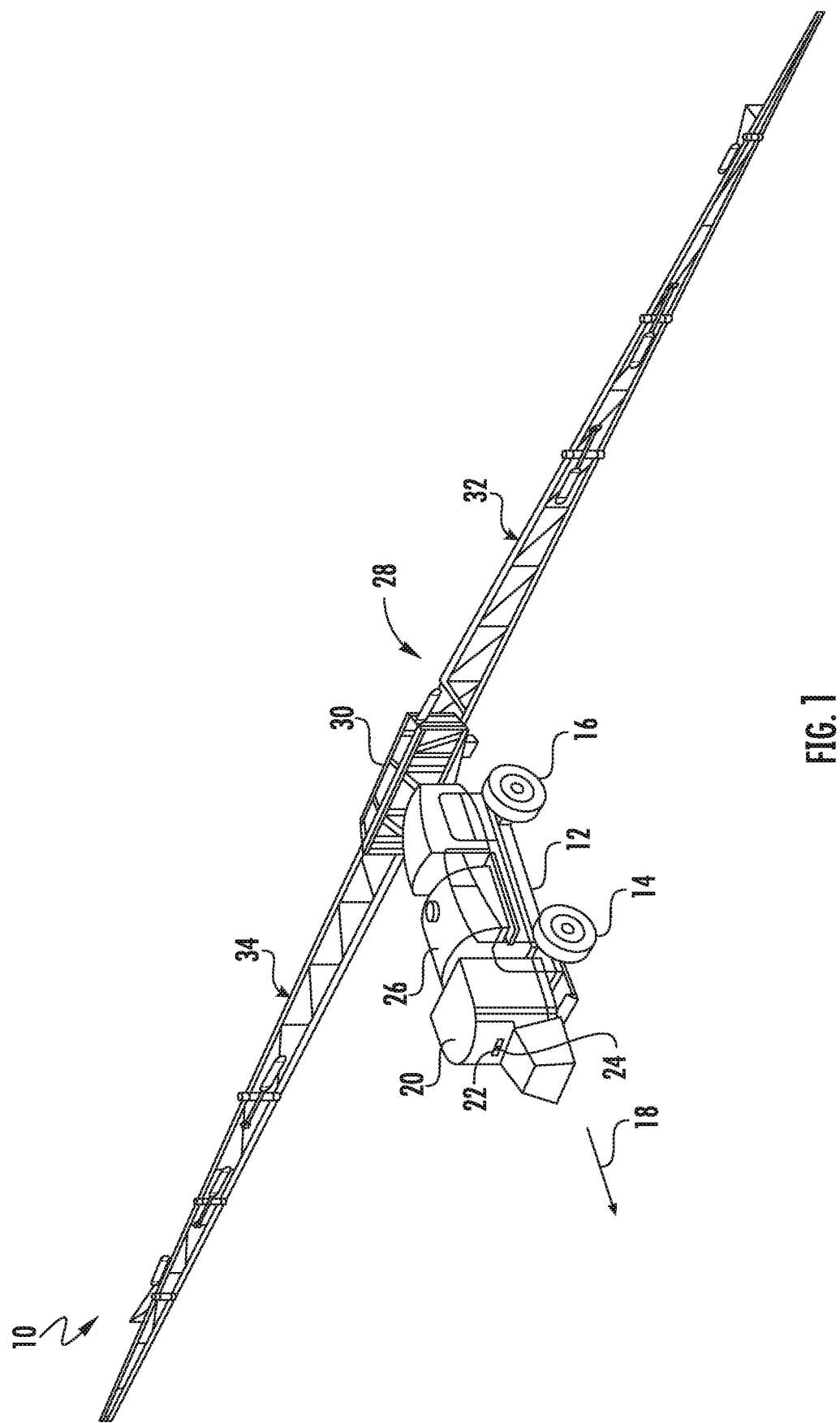
FIG. 1 illustrates a perspective view of some embodiments of a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of some embodiments can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination: A and C in combination: B and C in combination: or A, B, and C in combination.

In general, the present subject matter is directed to systems and methods for monitoring the quality of application of an agricultural product to a field. In several embodiments, a boom assembly may be configured to couple with a work vehicle. The vehicle and/or the boom assembly includes a plurality of spray nozzles that disperse the agricultural product carried by the applicator onto a field. During a spray operation, various application variables may affect a quality of application of the agricultural product to the field are monitored. For instance, the one or more application variables include at least one of an incorrect nozzle tip, an incorrect application rate, inclement weather meeting one or more criteria, boom assembly pressure exceeding a predefined pressure level, boom assembly movement exceeding a movement limit, a vehicle exceeding a predefined speed, or a turning speed or radius deviating from a predefined range or speed.

In several embodiments, to monitor the application variables, one or more sensors may be positioned on the vehicle, the boom assembly, or any other location for monitoring a condition that affects the overall application operation of the agricultural product.

In several embodiments, a controller is commutatively coupled to the one or more sensors and includes a processor and associated memory. The memory can store instructions that, when implemented by the processor, configure the controller to receive data associated with one or more application variables. The instructions may also configure the controller to analyze the data associated with one or more application variables to determine whether any of the one or more variables are outside of a predefined range defined by a lower and upper threshold. The predefined range for each of the one more application variables may be set either as an initial/default value or range or as an operator defined value or range that defines a generally optimal range for each respective value during an application operation. In addition, the controller may also be configured to determine a spray quality index that is a summation of each application variable. The spray quality index may also include a predefined range that estimates whether an application operation resulted in an appropriate coverage by the agricultural product.

In several embodiments, the instructions may further configure the controller to provide a notification when the data associated with one or more application variables are outside of the predefined range and/or when the overall spray quality index deviates from a predefined range. Based on the variable that deviates from its respective lower and upper threshold or the magnitude of deviation of the spray quality index, various notifications may be provided by the system. For example, for less important application variables and/or minimal deviations in spray quality index, an audible, visual, haptic, or other notification may be provided in a cab of the vehicle. However, in some instances, when the application variable is deemed to be of a higher priority or a larger deviation in spray quality index occurs, the controller may pause an application of the agricultural product until the notification is acknowledged by an operator. In addition, in several embodiments, the notification may also provide mitigation instructions for returning the application variable and/or the spray quality index to its respective predefined range.

Figure 2:
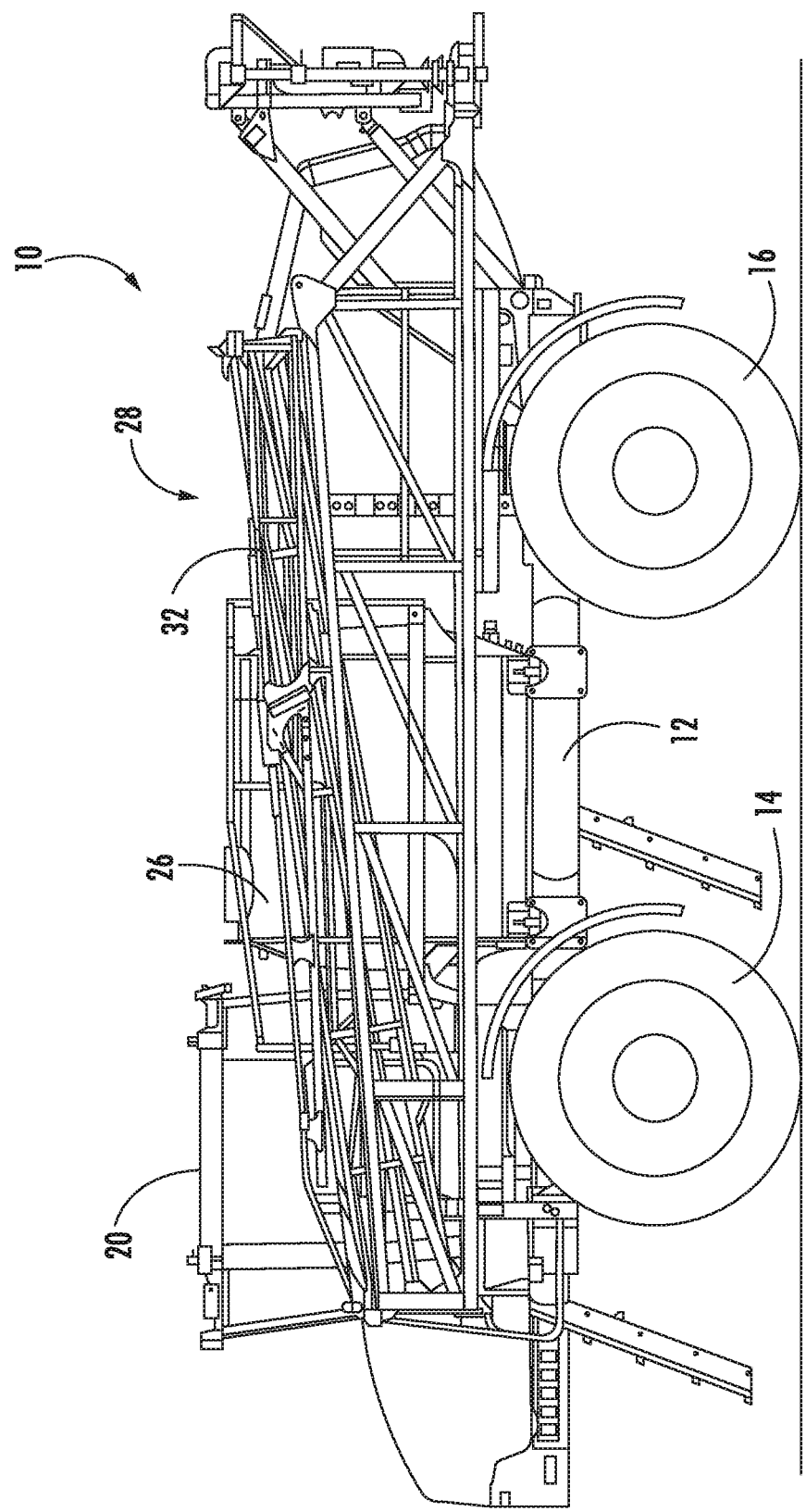
FIG. 2 illustrates a side view of an agricultural applicator system in accordance with aspects of the present subject matter.

Referring now to FIGS. 1 and 2, a work vehicle 10 is generally illustrated as a self-propelled agricultural applicator. However, in alternate embodiments, the work vehicle 10 may be configured as any other suitable type of work vehicle 10 configured to perform agricultural application operations, such as a tractor or other vehicle configured to haul or tow an application implement.

In various embodiments, the work vehicle 10 may include a chassis 12 configured to support or couple to a plurality of components. For example, front and rear wheels 14, 16 may be coupled to the chassis 12. The wheels 14, 16 may be configured to support the work vehicle 10 relative to a ground surface and move the work vehicle 10 in a direction of travel (e.g., as indicated by arrow 18 in FIG. 1) across a field or the ground surface. In this regard, the work vehicle 10 may include a power plant, such as an engine, a motor, or a hybrid engine-motor combination, to move the vehicle 10 along a field.

The chassis 12 may also support a cab 20, or any other form of operator's station, that provides various control or input devices (e.g., levers, pedals, control panels, buttons, and/or the like) for providing various notifications to an operator and/or permitting the operator to control the operation of the work vehicle 10. For instance, as shown in FIG. 1, the work vehicle 10 may include a human-machine interface (HMI) 22 for displaying messages and/or alerts to the operator and/or for allowing the operator to interface with the vehicle's controller through one or more user input devices 24.

The chassis 12 may also support a tank 26 and a boom assembly 28 mounted to the chassis 12. The tank 26 is generally configured to store or hold an agricultural product, such as a pesticide, a fungicide, a rodenticide, a fertilizer, a nutrient, and/or the like. The agricultural product stored in the tank 26 may be dispensed onto the underlying ground surface (e.g., plants and/or soil) through one or more nozzles mounted on the boom assembly 28.

As shown in FIGS. 1 and 2, the boom assembly 28 can include a frame 30 that supports first and second boom arms 32, 34 in a cantilevered nature. The first and second boom arms 32, 34 are generally movable between an operative or unfolded position (FIG. 1) and an inoperative or folded position (FIG. 2). When distributing product, the first and/or second boom arm 32, 34 extends laterally outward from the work vehicle 10 to cover wide swaths of soil, as illustrated in FIG. 1. However, to facilitate transport, each boom arm 32, 34 of the boom assembly 28 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
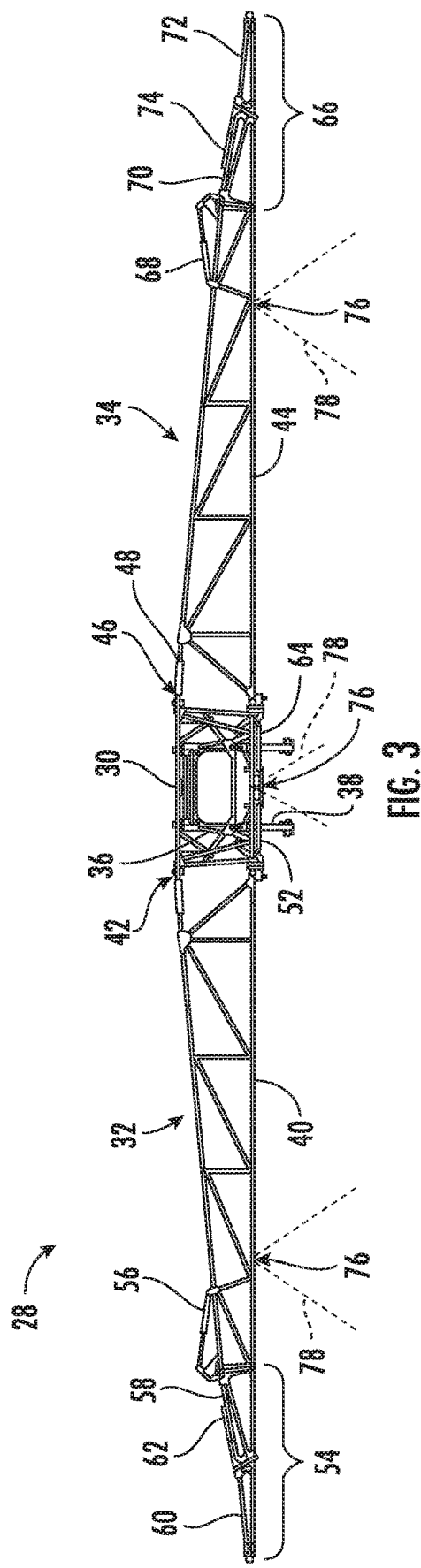
FIG. 3 illustrates a rear view of a boom assembly of a work vehicle in accordance with aspects of the present subject matter.

Referring to FIG. 3, the boom assembly 28 includes a mast 36 coupled to a frame 30 that, in combination, can support the boom assembly 28 on the vehicle 10. In some embodiments, such as the one illustrated in FIG. 3, the mast 36 is configured to couple to the work vehicle 10 (FIG. 2) via a linkage assembly 38. The frame 30 is further configured to support the first and second boom arms 32, 34 during operation and transport. As illustrated, the first and second boom arms 32, 34 are coupled to and extend from opposing side portions of the frame 30. In some examples, an inner section 40 of the first boom arm 32 is pivotally coupled to a first lateral side portion 42 of the frame 30, and an inner section 44 of the second boom arm 34 is coupled to an opposite, second lateral side portion 46 of the frame 30. In this configuration, the first and second boom arms 32, 34 may be folded forwardly or rearwardly from the illustrated operative position to an inoperative position that reduces the overall width of the vehicle 10.

In some examples, such as the embodiment illustrated in FIG. 3, the boom assembly 28 includes a positioning assembly 48 operably coupled to the frame 30 and the first and second boom arms 32, 34. The positioning assembly 48 may be configured to independently move the each of the first and second boom arms 32, 34 between the extended and folded positions. For example, in some embodiments, the first boom arm 32 includes an actuating device 52 (e.g., electromechanical actuator, hydraulic cylinder and/or pneumatic cylinder) extending between the inner section 40 of the first boom arm 32 and the frame 30.

The first boom arm 32 also includes an outer portion 54 having a peripheral actuating device 56. As illustrated, the outer portion 54 is coupled to the inner section 40 by a pivotal joint. Like the actuating device 52, the peripheral actuating device 56 may be an electromechanical actuator, hydraulic cylinder and/or pneumatic cylinder. In examples utilizing a hydraulic, and/or pneumatic cylinder, the cylinder may be configured to displace a piston rod extending from the device 56. Retracting the piston rod of the device 56 will cause the outer portion 54 to rotate upwardly from the illustrated product distribution/operative position to an inoperative position. However, it will be appreciated that alternative embodiments may employ outer portions configured to rotate forwardly or rearwardly to the inoperative position.

In the illustrated embodiment, the outer portion 54 includes an outer section 58, a breakaway section 60, and a biasing member 62. The outer section 58 extends between the inner section 40 and the breakaway section 60. The breakaway section 60 is pivotally coupled to the outer section 58 by a joint, and the biasing member 62 is configured to urge the breakaway section 60 toward the illustrated operative position. In this configuration, contact between the breakaway section 60 and an obstruction will drive the breakaway section to rotate. After the boom has passed the obstruction, the biasing member 62 will urge the breakaway section back to the operative position.

The structure of the second boom arm 34 is similar to the structure of the first boom arm 32. For instance, the second boom arm 34 includes an actuating device 64 (e.g., electromechanical actuator, hydraulic cylinder and/or pneumatic cylinder) extending between the inner section 44 and the frame 30. The second boom arm 34 also includes an outer portion 66 having a peripheral actuating device 68. As illustrated, the outer portion 66 is coupled to the inner section 44 by a pivotal joint. Like the device 64, the peripheral actuating device 68 may be an electromechanical actuator, hydraulic cylinder and/or pneumatic cylinder configured to rotate the outer portion 66 relative to the inner section 44 by electromechanically rotating the outer portion 66 and/or displacing a piston rod extending from the peripheral actuating device 68. Retracting the piston rod of the peripheral actuating device 68 will cause the outer portion 66 to rotate upwardly from the illustrated product distribution/operative position to an inoperative position. In some embodiments, the outer portions are configured to rotate forwardly or rearwardly to the inoperative position.

In the illustrated embodiment, the outer portion 66 also includes an outer section 70, a breakaway section 72, and a biasing member 74. The outer section 70 extends between the inner section 44 and the breakaway section 72. The breakaway section 72 is pivotally coupled to the outer section 70 by a joint, and the biasing member 74 is configured to urge the breakaway section 72 toward the illustrated operative position. In this configuration, contact between the breakaway section 72 and an obstruction will drive the breakaway section to rotate. After the boom has passed the obstruction, the biasing member 74 will urge the breakaway section back to the operative position. Although the boom assembly 28 is shown in FIG. 3 as including first and second boom arms 32, 34 each having an inner section and an outer portion coupled to each side portion of the frame 30, the boom assembly 28 may generally have any suitable number of boom arms 32, 34.

With further reference to FIG. 3, in various embodiments, the work vehicle 10 may include one or more sensors 76 configured to capture data indicative of an orientation or position of the boom assembly 28 relative to the ground surface 80 and/or data associated with one or more application variables. In some instances, the sensor(s) 76 may be installed or otherwise positioned on the boom assembly 28. For example, as shown in FIG. 3, a sensor 76 may be positioned on each of the first and second boom arms 32, 34. As such, each sensor 76 may have a field of view directed toward a predefined location as generally illustrated by dashed lines 78 in FIG. 3. In some examples, the sensor(s) 76 may additionally or alternatively be positioned at any other suitable location(s) on and/or coupled to any other suitable component(s) of the work vehicle 10.

Figure 4:
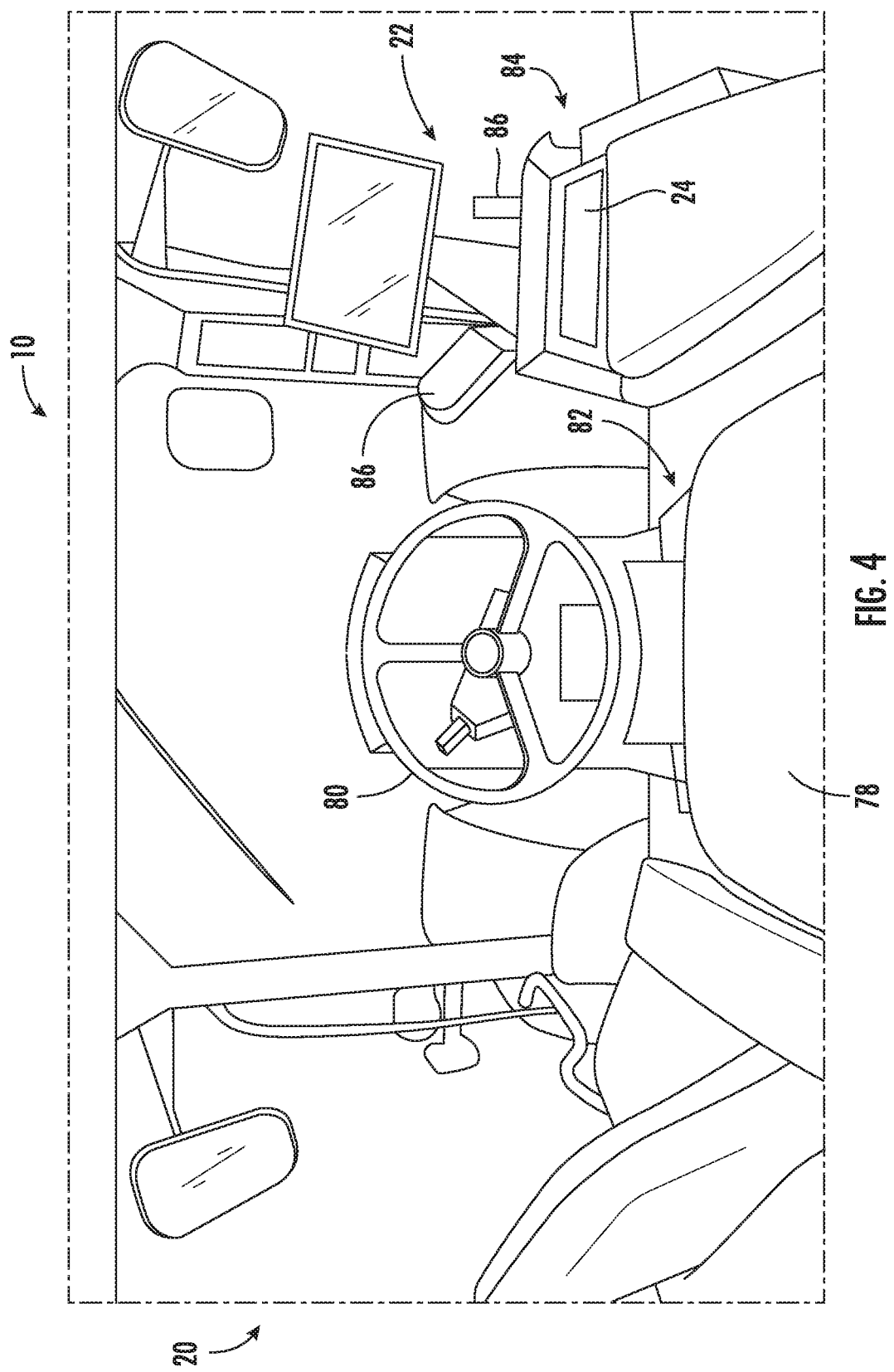
FIG. 4 illustrates a partial perspective view of a cab of the vehicle in accordance with aspects of the present subject matter.

Referring now to FIG. 4, an interior of the cab 20 of the work vehicle 10 may include a seat 78, on which the operator sits when operating the vehicle 10. In various embodiments, a steering wheel 80 is located near the seat 78, so as to be within arm's reach of the operator when the operator is seated. Though a steering wheel 80 is included in the illustrated embodiment, other embodiments of the vehicle 10 may include other devices for receiving steering inputs from the operator. For example, in place of a steering wheel 80, the cab 20 may have left/right control bars, a hand controller, pedals, or another suitable device for receiving steering inputs.

Also located near the seat 78, at the operator's feet can be one or more pedals 82. The pedals 82 may be configured to receive input from the operator for controlling the speed of the vehicle 10. For example, the pedals 82 may control a throttle, brakes, a clutch, other suitable systems, or a combination thereof. In other embodiments, pedals 82 may be used for steering inputs. Further, in embodiments in which the vehicle 10 is semi-autonomous or fully autonomous, the steering wheel 80 and/or the pedals 82 may be omitted.

Along one or both sides of the seat 78 may be an armrest 84. The armrest 84 may include one or more hand manipulation devices 86, the HMI 22, supported by an interface mount, and/or one or more user input devices 24. The HMI 22 may be used to present data to the operator, such as vehicle information (e.g., ground speed, oil pressure, engine temperature, etc.), implement operations information (e.g., rotor speed and grain loss), and manufacturer proprietary systems information (e.g. Advanced Farming Systems (AFS) information, including yield maps, position data, etc.). In addition, the HMI 22 may also be capable of presenting and displaying data associated with one or more application variables that can affect the application of the agricultural product. For instance, the one or more application variables that may affect the application operation can include at least one of a nozzle tip size and style, which agricultural product is being applied, an incorrect agricultural product application rate, inclement weather as determined by meeting one or more criteria, a boom assembly pressure exceeding a predefined pressure range, boom assembly movement (e.g., jounce) exceeding a movement range, a vehicle exceeding a predefined speed, or a turning radius exceeding predefined criteria.

If one or more of the application variables deviates from a predefined range, a notification may be provided within the cab 20 in the form of an audible notification, a visual notification, a haptic notification, or any other type of notification. For example, the audible notification may be provided through one or more speakers 128 (FIG. 5) within the cab 20 or otherwise positioned on the vehicle 10. The visual notification may be displayed on the HMI 22 or through any other device within the cab 20 and/or positioned on the vehicle 10. The haptic notification may be provided through the steering wheel 80, the seat 78, the armrest 84, or any other component of the cab 20 or vehicle 10. In some instances, upon receiving a notification, the work vehicle 10 may pause advancement of the work vehicle 10 and/or application of agricultural product until acknowledgment of the notification is provided by the operator. In various embodiments, acknowledgment by the operator may be inputted to the vehicle 10 through the user input device 24, or through any other system of the vehicle 10.

Figure 5:
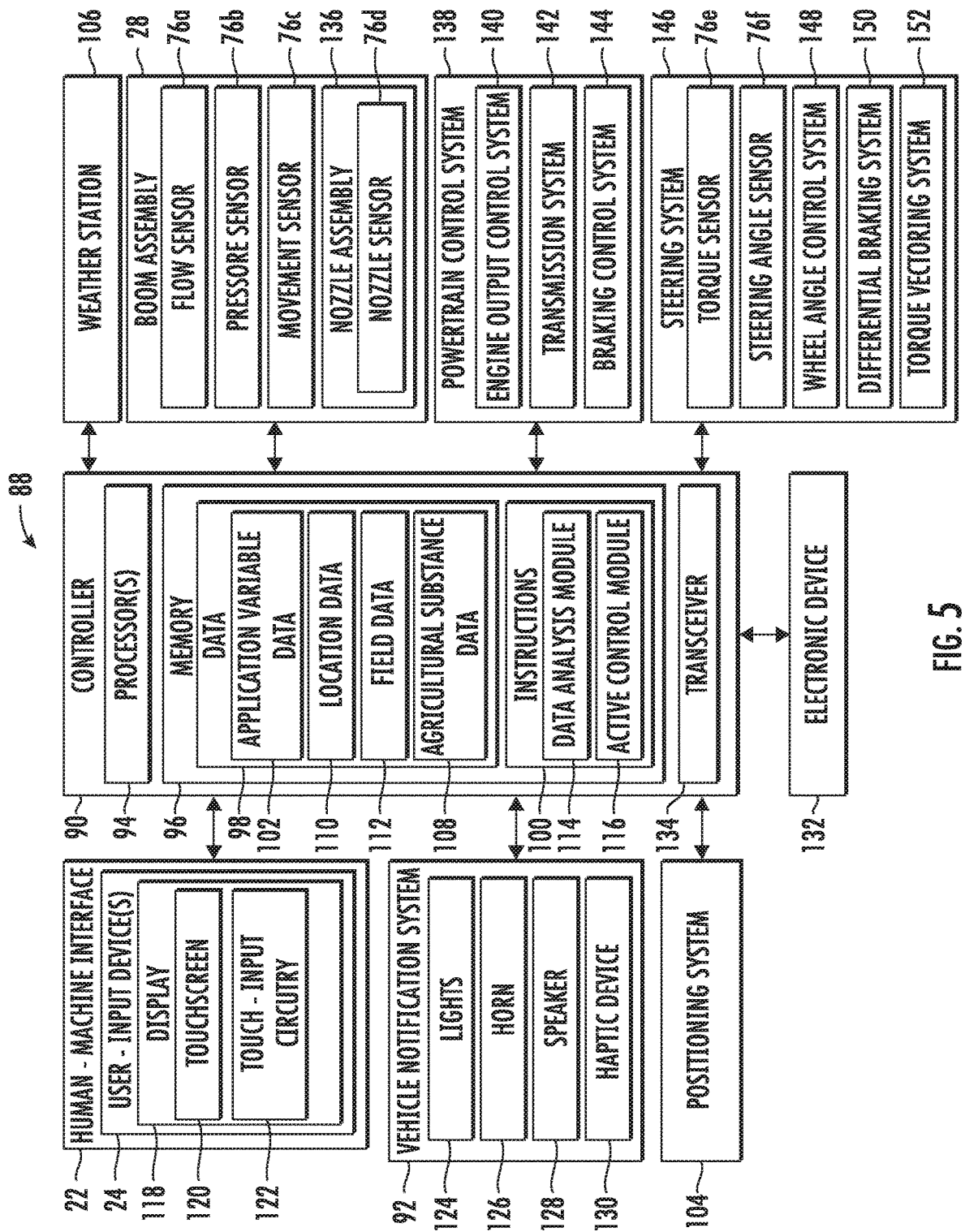
FIG. 5 illustrates a block diagram of components of the agricultural applicator system that is integrated into the vehicle in accordance with aspects of the present subject matter.

Referring now to FIG. 5, a schematic view of some embodiments of an agricultural applicator system 88 for monitoring one or more application variables based on the application of the agricultural product to a field is illustrated in accordance with aspects of the present subject matter. In general, the system 88 will be described herein with reference to the work vehicle 10 and the boom assembly 28 described above with reference to FIGS. 1-4. However, it should be appreciated that the disclosed system 88 may generally be utilized with work vehicles having any suitable vehicle configuration and/or implements having any suitable implement configuration.

In several embodiments, the system 88 may include a controller 90 and various other components configured to be communicatively coupled to and/or controlled by the controller 90, such as the HMI 22, a vehicle notification system 92, and/or various components of the work vehicle 10 and/or the boom assembly 28. As will be described in greater detail below; the controller 90 may be configured to receive data from various vehicle systems in relation to one or more application variables that may affect a desired application of the agricultural product to the field. For many applications, the one or more application variables are generally optimized to reduce application overlap, under application, or over application during the application operation. Accordingly, in some instances, a deviation of a single application variable from a desired condition or range can cause the active ingredient to be improperly applied to the field. The improper application can leave portions of a field which may require a make-up run that generates no revenue but accrues additional fuel and labor costs. A make-up run also causes additional ground compaction due to more passes and timing delays in killing the target pest or other operations dependent upon the spray application.

Based on an analysis of the data associated with one or more application variables, the controller 90 may be configured to provide a notification when the data associated with one or more application variables is determined to exceed or be outside of the predefined range for that respective application variable. In some embodiments, the data may be captured for the same section of the field both before and after the application operation has been performed. In some embodiments, the controller 90 may be configured to analyze the data to determine a spray quality index for the analyzed section of the field and/or whether the spray quality index is within predefined ranges. In various examples, the spray quality index may be determined by a summation of weighting the one or more application variables to determine whether a portion of the field had a sufficient amount of agricultural product applied thereto. In some examples, the weighting of each variable may differ based on the end affect of a variation from the predefined range defined by a lower and upper threshold or each variable may have a common weighting when calculating the spray quality index.

In general, the controller 90 may correspond to any suitable processor-based device(s), such as a computing device or any combination of computing devices. Thus, as shown in FIG. 5, the controller 90 may generally include one or more processor(s) 94 and associated memory devices 96 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 96 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 96 may generally be configured to store information accessible to the processor(s) 94, including data 98 that can be retrieved, manipulated, created and/or stored by the processor(s) 94 and instructions 100 that can be executed by the processor(s) 94.

In several embodiments, the data 98 may be stored in one or more databases. For example, the memory 96 may include an application variable database 102 for storing application variable data received from one or more sensor(s) 76a-f, a positioning device 104, a weather station 106, or any other device. The sensor(s) 76a-f, the positioning device 104, and/or the weather station 106 may be configured to continuously or periodically capture application variable data as the application operation is being performed via the boom assembly 28. In such embodiments, the application variable data transmitted to the controller 90 from the sensor(s) 76a-f, the positioning device 104, and/or the weather station 106 may be stored within the application variable database 102 for subsequent processing and/or analysis.

Moreover, in addition to the initial or raw sensor data received from the sensor(s) 76a-f, the positioning device 104, and/or the weather station 106, final or post-processing application variable data (as well as any intermediate application variable data created during data processing) may also be stored within the application variable database 102. For example, as will be described below, the controller 90 may be configured to analyze the data received from the sensor(s) 76a-f, the positioning device 104, and/or the weather station 106 using one or more data processing techniques or algorithms to determine a spray quality index for the analyzed portions of the field. In such embodiments, the application variable data data generated during implementation of the data processing techniques or algorithms may be stored within the database 118.

In order to generate the spray quality index, in some embodiments, the memory 96 may include an agricultural product database 108 that stores product information. The product information may include various information regarding the optimal conditions and rates of application for an individual product that is to be applied to the field. In some instances, the product information may be preloaded or sent to the vehicle 10 via wired or wireless communication therewith. Additionally, or alternatively, the product information may be manually inputted into the database.

Additionally, in several embodiments, the memory 96 may also include a location database 110 storing location information about the work vehicle 10 and/or the boom assembly 28. Specifically, as shown in FIG. 5, the controller 90 may be communicatively coupled to a positioning device(s) 104 installed on or within the work vehicle 10 and/or on or within the boom assembly 28. For example, in some embodiments, the positioning device(s) 104 may be configured to determine the location of the work vehicle 10 and/or the boom assembly 28 by using a satellite navigation positioning device 104 (e.g. a GPS system, a Galileo positioning system, the Global Navigation satellite system (GLO-NASS), the BeiDou Satellite Navigation and Positioning system, and/or the like). In such embodiments, the location determined by the positioning device(s) 104 may be transmitted to the controller 90 (e.g., in the form location coordinates) and subsequently stored within the location database 110 for subsequent processing and/or analysis. It should be appreciated that, in some embodiments, a first positioning device(s) 104 may be provided on and/or within the work vehicle 10 while a separate, second positioning device(s) 104 may be provided on and/or within the boom assembly 28.

In several embodiments, the location data stored within the location database 110 may also be correlated to the application variable data stored within the application variable database 102. For instance, in some embodiments, the location coordinates derived from the positioning device(s) 104 and the application variable data captured by the sensor(s) 76a-f and/or the weather station 106 may both be time-stamped. In such embodiments, the time-stamped data may allow each individual set of data captured by the sensor(s) 76a-f and/or the weather station 106 to be matched or correlated to a corresponding set of location coordinates received from the positioning device(s) 104, thereby allowing the precise location of the portion of the field associated with a given set of application variable data to be known (or at least capable of calculation) by the controller 90.

Additionally, as shown in FIG. 5, the memory 96 may include a field database 112 for storing information related to the field, such as application map data. In such embodiments, by matching each set of application variable data captured by the sensor(s) 76a-f and/or the weather station 106 to a corresponding set of location coordinates, the controller 90 may be configured to generate or update a corresponding application map AM (e.g., FIG. 6) associated with the field, which may then be stored within the field database 112 for subsequent processing and/or analysis. For example, in instances in which the controller 90 includes an application map AM stored within the field database 112, the application variable data captured by the sensor(s) 76a-f, the positioning device 104, and/or the weather station 106 may be mapped or otherwise correlated to the corresponding locations within the application map AM. Alternatively, based on the location data and the associated sensor data, the controller 90 may be configured to generate the application map AM that includes the geo-located application variable associated therewith. In some embodiments, the controller 90 may be configured to provide a plurality of maps in which each application variable is mapped independently onto the application map AM in an individual map. Additionally, or alternatively, the controller 90 may be configured to generate a composite map illustrating an overall geo-located spray quality index for the field.

With further reference to FIG. 5, in several embodiments, the instructions 100 stored within the memory 96 of the controller 90 may be executed by the processor(s) 94 to implement a data analysis module 114 or an active control module 116. In general, the data analysis module 114 may be configured to analyze the initial or raw sensor data captured by the sensor(s) 76a-f, the positioning device 104, and/or the weather station 106 to allow the controller 90 to estimate the spray quality index of one or more sections of the field. For instance, the data analysis module 114 may be configured to execute one or more suitable data processing techniques or algorithms that allows the controller 90 to accurately and efficiently analyze the sensor data, such as by applying corrections or adjustments to the data based on the sensor type, sensor resolution, and/or other parameters associated with the sensor(s) 76*a-f*, the positioning device 104, and/or the weather station 106, by filtering the data to remove outliers, by implementing sub-routines or intermediate calculations required to estimate the spray quality index based on one or more application variables, and/or by performing any other desired data processing-related techniques or algorithms.

In some examples, the plurality of application variables includes at least a first and a second application variable. In some instances, the first application variable is weighted differently from that of the second application variable in determining the spray quality index based on each factor's ultimate effect on the overall application of the agricultural product to the field. Further, the field may be determined to be sufficiently covered when the summation of the application variables, possibly in a weighted algorithm, is within a predefined range. Thus, in some embodiments, the controller 90 may provide a notification if any of the one or more application variables deviates from a predefined range or the spray quality index deviates from a predefined range as such an occurrence may cause an inadequate application to a portion of the field.

The active control module 116 may provide instructions for various other components commutatively coupled with the controller 90 based on the results of the data analysis module 114. For example, the active control module 116 may provide notification instructions to the vehicle notification system 92, the HMI 22, and/or a remote electronic device 132.

Referring still to FIG. 5, in operation, based on the data analysis performed by the processor(s) 94, information may be provided to the HMI 22 and/or a vehicle notification system 92. For instance, in some embodiments, a predefined range defined by a lower and upper threshold for each of the one more application variables may be set, either as an initial/default value or range or as an operator defined value or range. While an application operation is performed, one or more application variables, which can include at least one of an incorrect nozzle tip, an incorrect application rate, inclement weather meeting one or more criteria, a boom assembly pressure exceeding a predefined pressure level, boom assembly movement exceeding a movement limit, a vehicle exceeding a predefined speed, or a turning speed or radius deviating from a predefined range or speed, is monitored. If any of the one or more application variables deviates from the predefined range defined by a lower and upper threshold, a notification may be provided to the HMI 22 and/or through the vehicle notification system 92.

In some embodiments, each of the application variables may be ranked or categorized in to first (e.g., higher) and second (e.g., lower) priority categories. For instance, a variable that will have a great impact on the application priority may be classified as a higher propriety variable while an application variable that has a small impact on the application operation may be classified as having a lower priority. In some instances, when a higher priority variable deviates from a predefined range a first notification is provided in which user acknowledgment is needed for the application operation to continue. If a lower priority variable deviates from its predefined range, the controller 90 may provide a notification but continue to perform the application operation.

In some examples, the HMI 22 may include a display 118 having a touchscreen 120 mounted within a cockpit module, an instrument cluster, and/or any other location within the vehicle 10. The display 118 may be capable of displaying information related to the various notifications and accepting acknowledgment of a notification, when needed. For example, the HMI 22 may include an input device in the form of circuitry 122 within the touchscreen to receive an input corresponding with a location over the display 118. Other forms of input, including one or more joysticks, digital input pads, or the like can be used in place or in addition to touchscreen 120.

In some embodiments, the vehicle notification system 92 may prompt visual, auditory, and tactile notifications and/or warnings. For instance, vehicle brake lights 124 and/or vehicle emergency flashers may provide a visual alert. A vehicle horn 126 and/or speaker 128 may provide an audible alert. A haptic device 130 integrated into the steering wheel 80, the seat 78, the armrest 84, and/or any other location may provide a tactile alert. Additionally, the controller 90 and/or the vehicle notification system 92 may communicate with the HMI 22 of the vehicle 10. In addition to providing the notification to the operator, the controller 90 may additionally store the location of the vehicle 10 at the time of the notification. The stored location may be displayed through the application map AM to illustrate locations of the field in which an agricultural product may have been misapplied.

Further, the system 88 may communicate via wired and/or wireless communication with one or more remote electronic devices 132 through a transceiver 134. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 132 may also include a display for displaying information to a user. For instance, the electronic device 132 may display one or more user interfaces and may be capable of receiving remote user inputs to set a predefined range for any of the application variables and/or to input any other information, such as the agricultural product to be used in an application operation. In addition, the electronic device 132 may provide feedback information, such as visual, audible, and tactile alerts. It will be appreciated that the electronic device 132 may be any one of a variety of computing devices and may include a processor and memory. For example, the electronic device 132 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

Referring still to FIG. 5, as provided herein, in conjunction with the sensor(s) 76*a-f* of the vehicle 10, the vehicle 10 may include at least one mobile weather station 106 that can be mounted to the vehicle 10, the boom assembly 28, and/or other locations. The mobile weather station 106 can contain any of the sensors that are normally found on a stationery weather station that monitor one or more weather criteria, such as temperature, wind speed, wind direction, relative humidity, barometric pressure, cloud cover, and trends thereof. During operation, if one or more of the criteria changes, such as the wind direction or speed changes, the changes can reduce the ability to uniformly apply the agricultural product to the field. By using the information provided by the mobile weather station 106, the system 88 can determine when inclement weather exists for the application operation. If it is determined that inclement weather exists, a notification can be provided to the HMI 22, the vehicle notification system 92, and/or any other component to warn the operator of a less-than-ideal operating condition when such a condition is detected. The determination of inclement weather may be based on a combination of the detected weather conditions in combination with the other application variables. For instance, when applying a smaller or finer agricultural product, a lower wind speed may lead to an incorrect application when compared to an agricultural product having a larger size. In such instances, the maximum wind speed allowed during application of the various products may differ. Likewise, any other weather criteria may also be altered based on the remaining application variables.

With further reference to FIG. 5, the boom assembly 28 may also include various sensors, such as a flow sensor 76a, a pressure sensor 76b, a movement sensor 76c, and/or any other sensor. For example, in some embodiments, a flow rate of agricultural product through the boom assembly 28 is measured by the flow sensor 76a and a distribution line pressure may be detected by the pressure sensor 76b to detect potential errors in operation. For example, each nozzle dispenses product at a dispense rate proportional to the distribution line pressure. If the measured total flow is not equal to the total flow expected, then it is likely that one or more nozzles may be worn, damaged, or plugged. In such situations, a notification may be provided to the HMI 22, the notification system 92, or through another component.

Further, in various examples, the movement sensor(s) 76c may generally correspond to any suitable sensing device(s) for detecting data related to position, angle, displacement, distance, speed, acceleration of any component of the boom assembly 28. For example, in some embodiments, the movement sensor(s) 76c may be light detection and ranging (LIDAR) sensors that are configured to emit one or more output signals for reflection off of the ground surface and receive or sense the return signal(s). Additionally, or alternatively, the movement sensor(s) 76c may correspond to an imager (an area-type image sensor, such as a CCD or a CMOS image sensor, and image-capturing optics that capture an image of an imaging field of view), a radio detection and ranging (RADAR) sensor(s), a Hall effect sensor(s), a gyroscope sensor(s), a magnetometer sensor(s), an accelerometer sensor(s), a yaw-rate sensor(s), a piezoelectric sensor(s), a position sensor(s), a complementary metal-oxide-semiconductor (CMOS) sensor(s), a pressure sensor(s), a capacitive sensor(s), an ultrasonic sensor(s), or any other suitable type of sensor(s). In some examples, when movement beyond a predefined range is detected by the movement sensor 76c, a notification may be generated by the controller 90.

A nozzle assembly 136 can be at least partially supported by the boom assembly 28 and include a series of commonly designed nozzles, variously designed nozzles, and/or a turret of nozzles that may be adjusted based on the desired application operation and agricultural product. One or more sensors 76d may be operably coupled with one or more of the nozzles to capture data indicative of the nozzles. For instance, the sensors 76d may collect data related to a flow rate from the nozzle, a blockage of the nozzle, an agricultural product being dispensed from the nozzle and so on. Based on the captured data, if an application variable, such as a blockage of the nozzle, incorrect installation of a nozzle, block of a nozzle, etc. is determined by the controller 90, a notification may be provided to the HMI 22, the notification system 92, or through another component.

In some embodiments, a powertrain control system 138 includes an engine output control system 140, a transmission control system 142, and a braking control system 144. Through the usage of any of these systems, the controller 90 may collect data related to one or more of the application variables during operation of the vehicle 10 and/or during an application operation. Further, the manipulation of the powertrain control system 138 of the vehicle 10 can be classified as variables that affect the application operation. Therefore, the controller 90 may provide notifications if one or more of variables within the powertrain control system 138 either exceed a predefined range or if the actions taken by the powertrain control system 138 contribute to a spray quality index exceeding a predefined range.

The engine output control system 140 is configured to vary the output of the engine to control the speed of the vehicle 10. For example, the engine output control system 140 may vary a throttle setting of the engine, a fuel/air mixture of the engine, a timing of the engine, and/or other suitable engine parameters to control engine output. In addition, the transmission control system 142 may adjust gear selection within a transmission to control the speed of the vehicle 10. Furthermore, the braking control system 144 may adjust braking force, thereby controlling the speed of the vehicle 10. While the illustrated powertrain control system 138 includes the engine output control system 140, the transmission control system 142, and the braking control system 144, it should be appreciated that alternative embodiments may include one or two of these systems, in any suitable combination. Further embodiments may include a powertrain control system 138 having other and/or additional systems to facilitate adjusting the speed of the vehicle 10.

Still referring to FIG. 5, a steering system 146 can include a torque sensor 76e, a steering angle sensor 76f, a wheel angle control system 148, a differential braking system 150, and/or a torque vectoring system 152 that may be used to steer (e.g., adjust the steering angle) the vehicle 10. Each of these components may monitor and/or control a function of the steering system 146 of the vehicle 10. The steering angle sensor 76f may provide data related to an instantaneous steering direction of the vehicle 10 while the torque sensor 76e may sense a torque on the steering wheel 80 indicating an operator's intention for manipulating the steering system 146. The manipulation of the direction and speed of alteration are variables that affect the application operation and, therefore, the controller 90 may provide notifications if one or more of variables within the steering system 146 either exceed a predefined range or if the actions taken by the steering system 146 contribute to a spray quality index exceeding a predefined range.

The wheel angle control system 148 may rotate one or more wheels 14, 16 (FIG. 1) or tracks of the vehicle 10 (e.g., via hydraulic actuators) to steer the vehicle 10 based at least in part on the initial curvature of the virtual path. By way of example, the wheel angle control system 148 may rotate front wheels/tracks 14, rear wheels/tracks 16, and/or intermediate wheels/tracks of the vehicle 10, either individually or in groups. The differential braking system 150 may independently vary the braking force on each lateral side of the vehicle 10 to direct the vehicle 10. Similarly, the torque vectoring system 152 may differentially apply torque from the engine to wheels 14, 16 and/or tracks on each lateral side of the vehicle 10. Further embodiments may include a steering system 146 having other and/or additional systems to facilitate directing the vehicle 10 based at least in part on respective initial curvatures of the iteratively calculated virtual paths (e.g., an articulated steering system, differential drive system, etc.), for example.

In operation, data is provided to the controller 90 that relates to various systems and components of the vehicle 10 and the boom assembly 28. In response, the controller 90 may analyze the data associated with the one or more variables to determine whether any of the one or more variables deviates from a predefined range for that respective variable. In addition, the controller 90 may also calculate an overall spray quality index based on a summation of the variables to determine if the index is within a predefined range. If any of the one or more variables and/or the spray quality index deviates from a predefined range, a notification may be provided to the operator. In some embodiments, the one or more variables may be classified based on priority and/or based on a deviation from each respective lower and upper threshold. In such cases, when the variable is classified as lower priority and/or the deviation is minimal, a first notification may be provided to the operator. When the variable is classified as higher priority and/or the deviation is larger, a second notification may be provided. In addition to the second notification, the application operation may pause or cease until acknowledgment of the notification is received from the operator.

In some embodiments, the system 88 may also provide the operator with various mitigation techniques for returning the application variable to operation within the predefined range and/or for manipulating one or more variable to return the spray quality index to a predefined range. For example, when inclement weather is detected, the notification may provide a weather update and an estimate on when the weather will return to a more optimal condition for continuing the application operation. Additionally, or alternatively, when an incorrect nozzle or a poorly functioning nozzle is detected, the notification may provide information relating to the location of the poorly performing nozzle and/or information relating to the model of the nozzle for providing an appropriate replacement. Additionally, or alternatively, when an incorrect application rate is detected, the controller 90 may provide instructions for altering a function of the vehicle 10 that assists in correcting the application rate. It will be appreciated that notifications provided by the controller 90 may include any other information relating to any other component of the vehicle 10 and/or the boom assembly 28 and instructions for mitigating any issue that may occur in relation to those components.

Figure 6:
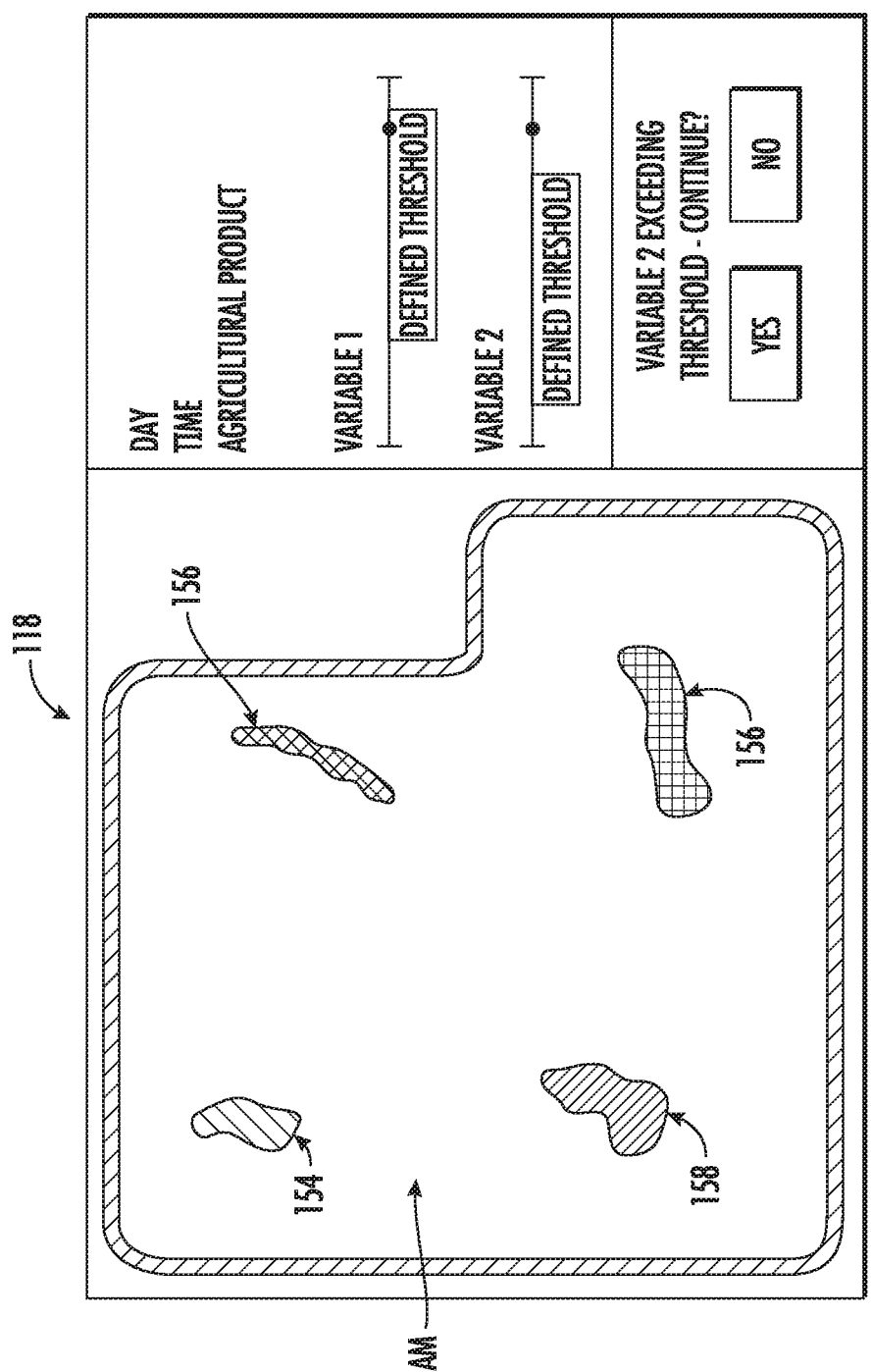
FIG. 6 illustrates an example application map in accordance with aspects of the present subject matter.

Referring now to FIG. 6, during an application operation, the controller 90 can receive data relating to at least one application variable. The controller 90 can store and analyze the received data, along with store a GPS signal or location data from the positioning device and represent the collected data relative to a location in an application map AM. Using such analysis, the controller 90 can illustrate whether each variable relative to a location was within the predefined range during the application operation. In addition, the controller 90 may also provide an overall application map (AM) that considers each of the one or more application variables in summation to determine areas of concern within the field. The areas of concern may be highlighted on the application map. In some examples, the operator may choose various portions of the map independently to see each variable measurement at the specific location while application at the location was performed.

In some examples, the application map may also illustrate the location of each generated notification that may be useful for supplemental applications of agricultural product. In addition, the areas that generated notifications may be further monitored by the operator and, based on the outcome of the application exceeding a predefined range, the operator may adjust the user inputted lower and upper thresholds. For instance, in some situations, an operator may notice that a lower application rate is sufficient for the desired results. In response, the application rate lower and upper threshold may be reduced so that excessive agricultural product usage may be reduced.

Furthermore, the controller 90 may indicate the various notification regions 154, 156, 158, on the map based on a level of priority, which may correspond to the level of notification provide to the operator. For instance, when a lower priority variable deviates from the predefined range, the map may indicate a first pattern over a first region 154 of the field in which the variable deviated from the lower and upper threshold. A second region 156 may be of higher priority and include a second pattern thereon. Likewise, a third region 158 may have a third pattern to signify a highest level of concern to the user based on a higher priority variable exceeding its predefined range and/or the spray quality index deviating greatly from its predefined range.

Figure 7:
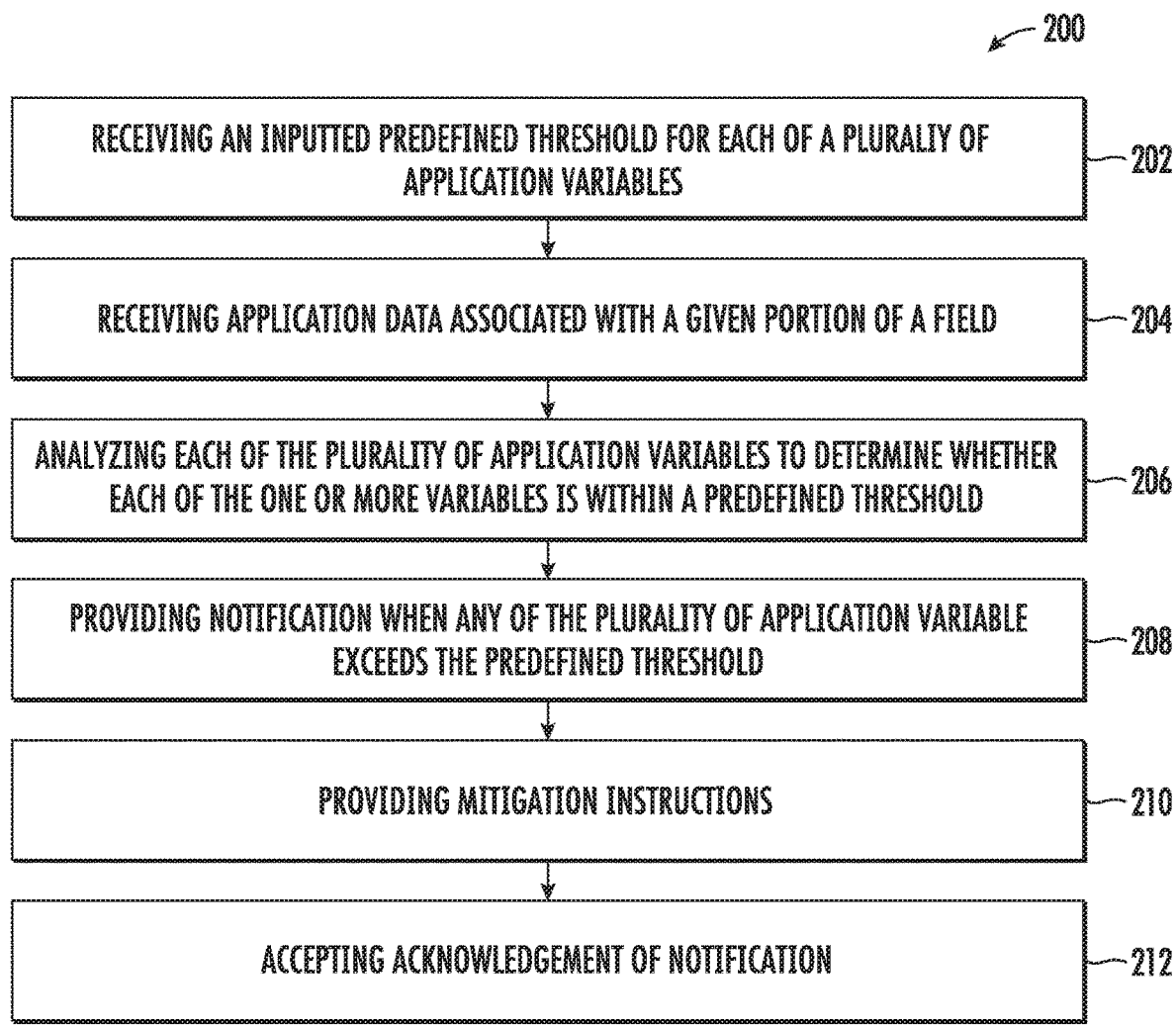
FIG. 7 illustrates a flow diagram of some embodiments of a method for monitoring one or more application variables during an application operation in accordance with aspects of the present subject matter.

Referring now to FIG. 7, a flow diagram of some embodiments of a method 200 of monitoring a plurality of application variables as an application operation is being performed within a field using a work vehicle 10 is illustrated in accordance with aspects of the present subject matter. In general, the method 200 will be described herein with reference to the vehicle 10, the boom assembly 28, and the system 88 described above with reference to FIGS. 1-6. However, it should be appreciated by those of ordinary skill in the art that the disclosed method 200 may generally be utilized to monitor one or more application variables of any suitable applicator associated with any suitable agricultural vehicle and/or may be utilized in connection with a system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving a predefined range for each of the plurality of application variables. For instance, as indicated above, there may be one or more variables that affect a spray quality index during application of an agricultural product to a field. Each of the predefined ranges may be initially configured as a default value or range that may be altered by an operator.

Additionally, at (204), the method 200 may include receiving application data associated with a given portion of the field. In some examples, the application data corresponds to each of the plurality of application variables for a given portion of the field as an agricultural product is applied to the field. For instance, as indicated above, the controller 90 may receive data from various components of the vehicle 10 prior to, during, and/or after an application operation.

Moreover, at (206), the method 200 may include analyzing each of the plurality of application variables to determine whether each of the one or more application variables is within the predefined range for each of a plurality of application variables and/or whether the overall spray quality index deviates from a predefined range. Based on the received data and the geo-location of the boom assembly 28, the controller 90 may map each variable independently and within a composite map. In some examples, the composite map may include a summation of the application variables to indicate zones that may have had an over-application or an under-application of agricultural product. In some examples, the plurality of application variables includes at least a first and a second application variables. In some instances, the first application variable is weighted differently from that of the second application variable in determining the spray quality index.

In addition, at (208), the method 200 may include providing a notification when any of the plurality of application variables deviates from the predefined range or the spray quality index deviates from a predefined range. In some instances, at (210), the method 200 may include providing mitigation instructions for adjusting one or more variables. As provided herein, in some examples, the notification provided when the one or more application variables deviates from the predefined range may be produced as an audible sound within a cab 20 of a work vehicle 10 and/or displayed on a HMI 22 within a cab 20 of a work vehicle 10. In some instances, at (212), the method 200 can further include pausing the application operation until the notification is acknowledged by an operator Further, in some instances, the method 200 can also include receiving location data associated with the boom assembly 28 and correlating the location data to the one or more application variables to generate or update the application map AM associated with the field. Thus, various zones of concern may be stored in the memory 96 and graphically illustrated to an operator in the form of the application map AM (FIG. 6). Based on the stored data and the geo-location of the vehicle 10, in some examples, the method 200 can include providing a warning when the boom assembly 28 approaches a location that previously generated a notification that at least one of the one or more application variables deviated from a predefined range.

It is to be understood that the steps of the method 200 is performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the method 200, is implemented in software code or instructions which are tangibly stored on a tangible computer readable medium. The controller loads the software code or instructions via a direct interface with the computer readable medium or via a wired and/or wireless network. Upon loading and executing such software code or instructions by the controller, the controller may perform any of the functionality of the controller described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural applicator system comprising:
a boom assembly operably supported by a chassis;
one or more nozzles positioned along the boom assembly and configured to selectively dispense an agricultural product therefrom;
a sensor operably coupled with the boom assembly and configured to capture data associated with one or more application variables; and
a controller commutatively coupled to the sensor, the controller including a processor and associated memory, the memory storing instructions that, when implemented by the processor, configure the controller to:
receive, from the sensor, the data associated with the one or more application variables, the data provided from at least a steering system coupled with the chassis;
analyze the data associated with the one or more application variables to determine whether any of the one or more application variables are outside of a predefined range defined by a lower and upper threshold;
display, with a user input device, a representation of the one or more application variables relative to the predefined range;
provide a notification when the data associated with the one or more application variables are outside of the predefined range;
generate a map of a field associated with the agricultural product applied illustrating one or more regions when the data associated with the one or more application variables are outside of the predefined range, wherein the one or more regions includes a first region in which a first variable of the one or more application variables deviates from a first variable predefined range, the deviation of the first variable from the first variable predefined range associated with a first priority level and a second region in which a second variable of the one or more application variables deviates from a second variable predefined range, the deviation of the second variable from the second variable predefined range associated with a second priority level, the first variable of the one or more application variables having a lesser effect on a spray quality index than the second variable of the one or more application variables; and
provide a warning when the boom assembly approaches a location of the first region or the second region.

2. The system of claim 1, wherein the sensor comprises at least one of a LIDAR device, a RADAR device, an imager, or an ultrasound device.

3. The system of claim 1, wherein the notification of the one or more application variables that deviates from the predefined range is provided on a human-machine interface.

4. The system of claim 1, wherein the one or more application variables includes an incorrect nozzle tip.

5. The system of claim 1, wherein the one or more application variables includes a boom assembly pressure exceeding a predefined pressure level.

6. The system of claim 1, wherein the one or more application variables includes a boom assembly movement exceeding a movement limit.

7. The system of claim 1, wherein the one or more application variables includes a turning speed or radius deviating from the predefined range or speed.

8. An agricultural applicator system comprising:
   a boom assembly;
   one or more nozzles positioned along the boom assembly and configured to selectively dispense an agricultural product therefrom;
   a sensor operably coupled with the boom assembly and configured to capture data associated with one or more application variables;
   a controller commutatively coupled to the sensor, the controller including a processor and associated memory, the memory storing instructions that, when implemented by the processor, configure the controller to:
      receive, from the sensor, the data associated with the one or more application variables;
      define each of the one or more application variables as a lower priority variable or a higher priority variable,
      analyze the data associated with the one or more application variables to determine whether any of the one or more application variables are outside of a predefined range defined by a lower and upper threshold;
      display, on a display of a user input device, a representation of the one or more application variables relative to the predefined range;
      provide a notification when the data associated with the lower priority variable of the one or more application variables is outside of its respective predefined range; and
      pause an application operation of the agricultural product exhausted from each of the one or more nozzles positioned along the boom assembly until the notification is acknowledged by an operator when the data associated with the higher priority variable of the one or more application variables is outside of its respective predefined range; and
   a positioning device communicatively coupled to the controller, the controller being configured to receive location data from the positioning device associated with the boom assembly and correlate the location data to the one or more application variables to generate or update an application map associated with a field, the application map illustrating a first region of the field having the agricultural product applied thereto with the lower priority variable of the one or more application variables outside of its respective predefined range and a second region of the field having the agricultural product applied thereto with the higher priority variable of the one or more application variables outside of its respective predefined range.

9. The system of claim 8, wherein the sensor comprises at least one of a LIDAR device, a RADAR device, an imager, or an ultrasound device.

10. The system of claim 8, wherein the notification of the one or more application variables that deviates from the predefined range is provided on a human-machine interface.

* * * * *